United States Patent
Takeuchi

(10) Patent No.: US 11,846,205 B2
(45) Date of Patent: Dec. 19, 2023

(54) JIG FOR ASSEMBLING AND EXTRACTING BLADE ROOT SPRING, AND METHOD FOR ASSEMBLING AND EXTRACTING BLADE ROOT SPRING

(71) Applicant: MITSUBISHI HEAVY INDUSTRIES, LTD., Tokyo (JP)

(72) Inventor: Yuto Takeuchi, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/801,368

(22) PCT Filed: Mar. 30, 2021

(86) PCT No.: PCT/JP2021/013449
§ 371 (c)(1),
(2) Date: Aug. 22, 2022

(87) PCT Pub. No.: WO2021/200893
PCT Pub. Date: Oct. 7, 2021

(65) Prior Publication Data
US 2023/0035117 A1  Feb. 2, 2023

(30) Foreign Application Priority Data

Apr. 3, 2020  (JP) ................. 2020-067480

(51) Int. Cl.
*F01D 5/30* (2006.01)
*F01D 25/28* (2006.01)

(52) U.S. Cl.
CPC ............. *F01D 5/30* (2013.01); *F01D 25/285* (2013.01); *F05D 2220/32* (2013.01); *F05D 2260/36* (2013.01); *F05D 2260/38* (2013.01)

(58) Field of Classification Search
CPC  F01D 5/30–326; B23P 19/006; B23P 19/027; B25C 7/00; B25D 17/28; B25B 27/04; B25B 27/30
See application file for complete search history.

(56) References Cited

U.S. PATENT DOCUMENTS 4,455,730 A * 6/1984 Guenther .............. F01D 25/285
29/252
7,128,537 B2 * 10/2006 Anner ..................... B23P 6/002
416/239

(Continued)

FOREIGN PATENT DOCUMENTS

CN 108019241 A * 5/2018 ............. B23P 19/04
JP 62-297078 12/1987

(Continued)

OTHER PUBLICATIONS

International Search Report dated May 25, 2021 in corresponding International Application No. PCT/JP2021/013449, with English language translation.

(Continued)

*Primary Examiner* — Topaz L. Elliott
(74) *Attorney, Agent, or Firm* — Wenderoth, Lind & Ponack, L.L.P.

(57) ABSTRACT

A jig for assembling and extracting a blade root spring for fixing a rotor blade to a rotor includes: an extrusion mechanism for extruding the blade root spring or an extrusion rod pressed against the blade root spring; and a base plate to which the extrusion mechanism is fixed. The base plate is formed with a first groove for receiving a reaction force which is obtained when the extrusion mechanism extrudes the extrusion rod toward the blade root spring to extrude and assemble the blade root spring or to extract the blade root spring.

10 Claims, 12 Drawing Sheets

(56) References Cited

U.S. PATENT DOCUMENTS

| | | | | |
|---|---|---|---|---|
| 7,377,749 | B2* | 5/2008 | Charrier | F16F 15/34 |
| | | | | 416/119 |
| 7,455,505 | B2* | 11/2008 | Hartmann | F01D 5/005 |
| | | | | 29/889.1 |
| 8,142,161 | B2* | 3/2012 | Prince | F01D 5/323 |
| | | | | 416/221 |
| 9,381,602 | B2* | 7/2016 | Holmes | B23P 15/04 |
| 2005/0100445 | A1* | 5/2005 | Anner | B25B 27/023 |
| | | | | 416/220 R |
| 2005/0226728 | A1* | 10/2005 | Charrier | F01D 5/027 |
| | | | | 416/144 |
| 2005/0271511 | A1* | 12/2005 | Pasquiet | F01D 5/3015 |
| | | | | 416/220 R |
| 2006/0039790 | A1* | 2/2006 | Hartmann | F01D 5/3007 |
| | | | | 416/220 R |
| 2015/0328728 | A1* | 11/2015 | Holmes | B23P 15/02 |
| | | | | 29/889.1 |
| 2017/0274510 | A1* | 9/2017 | Kolvick | F01D 5/005 |

FOREIGN PATENT DOCUMENTS

| | | |
|---|---|---|
| JP | 5529059 | 6/2014 |
| JP | 2019-78246 | 5/2019 |
| WO | 2015/129580 | 9/2015 |

OTHER PUBLICATIONS

Translation of the International Preliminary Report on Patentability dated Oct. 13, 2022 in corresponding International Application No. PCT/JP2021/013449.

* cited by examiner

JIG FOR ASSEMBLING AND EXTRACTING BLADE ROOT SPRING, AND METHOD FOR ASSEMBLING AND EXTRACTING BLADE ROOT SPRING

TECHNICAL FIELD

The present disclosure relates to a jig for assembling and extracting a blade root spring, and a method for assembling and extracting the blade root spring.

The present application claims priority on Japanese Patent Application No. 2020-67480 filed on Apr. 3, 2020, the entire content of which is incorporated herein by reference.

BACKGROUND

In a rotary machine such as a gas turbine including a rotor with a fixed rotor blade, a blade root spring for fixing the rotor blade to the rotor by pressing the rotor blade radially outward of the rotor is inserted between the rotor blade and the rotor. With the rotor blade spring, it is possible to suppress backlash of the rotor blade. In order to assemble or extract the blade root spring, a worker has conventionally hit the blade root spring with a hammer. However, since a workplace is a narrow place between turbine disks, there are problems that workability is poor and a work time increases.

To cope therewith, Patent Document 1 discloses a jig for extracting a turbine blade connecting pin for connecting a turbine blade and a rotor wheel to each other, although the purpose of the jig is not assembling and extracting a blade root spring. The jig ejects the turbine blade connecting pin from a pin housing portion provided with the turbine blade connecting pin, by mounting the jig itself on the surface of the rotor wheel with a magnet, and sequentially hydraulically inserting a plurality of ejector pins into the pin housing portion to press the ejector pins against the turbine blade connecting pin.

CITATION LIST

Patent Literature

Patent Document 1: JP5529059B

SUMMARY

Technical Problem

In the jig of Patent Document 1, the magnet receives a reaction force which is received by the jig when the ejector pins are pressed against the turbine blade connecting pin. However, since the blade root spring is provided to press the rotor blade radially outward of the rotor, a force required to insert the blade root spring between the rotor blade and the rotor or extract the blade root spring from between the rotor blade and the rotor is extremely large, as compared with the turbine blade connecting pin. In particular, since the blade root spring is extracted after the use of the rotary machine, the burned blade root spring and rotor may be stuck to each other. In this case, since the force required to extract the blade root spring is further increased, it may be impossible to receive the reaction force only by fixing the jig to the rotor with the magnet.

In view of the above, an object of at least one embodiment of the present disclosure is to provide a jig for assembling and extracting a blade root spring, and a method for assembling and extracting the blade root spring, which are capable of improving efficiency of assembly and extraction work for the blade root spring.

Solution to Problem

In order to achieve the above object, a jig for assembling and extracting a blade root spring according to the present disclosure is a jig for assembling and extracting a blade root spring for fixing a rotor blade to a rotor, that includes: an extrusion mechanism for extruding the blade root spring or an extrusion rod pressed against the blade root spring; and a base plate to which the extrusion mechanism is fixed. The base plate is formed with a first groove for receiving a reaction force which is obtained when the extrusion mechanism extrudes the extrusion rod toward the blade root spring to extrude and assemble the blade root spring or to extract the blade root spring.

Further, a method for assembling and extracting a blade root spring according to the present disclosure is a method for assembling and extracting a blade root spring for fixing a rotor blade to a rotor, that includes: a preparation step of preparing a jig that includes an extrusion mechanism for extruding the blade root spring or an extrusion rod pressed against the blade root spring, and a base plate to which the extrusion mechanism is fixed; a mounting step of mounting the jig on the rotor; and an extrusion step of extruding the extrusion rod or the blade root spring by the extrusion mechanism. The base plate is formed with a first groove configured to allow for insertion of a protrusion of the rotor. The extrusion step includes receiving a reaction force, which is obtained when the extrusion mechanism extrudes the extrusion rod toward the blade root spring to extrude and assemble the blade root spring or to extract the blade root spring, by bringing the protrusion into contact with an inner surface of the first groove.

Advantageous Effects

With the jig for assembling and extracting the blade root spring, as well as the method for assembling and extracting the blade root spring of the present disclosure, since the extrusion mechanism extrudes the extrusion rod toward the blade root spring to extrude and assemble the blade root spring or to extract the blade root spring, it is possible to improve efficiency of the assembly and extraction work for the blade root spring. Further, with the jig being mounted on the rotor, by inserting the protrusion of the rotor in the first groove, it is possible to receive the reaction force, which is obtained when the extrusion mechanism extrudes the extrusion rod toward the blade root spring to extract the blade root spring or to extrude and assemble the blade root spring, by bringing the protrusion into contact with the inner surface of the first groove.

DETAILED DESCRIPTION

Hereinafter, a jig for assembling and extracting a blade root spring, and a method for assembling and extracting the blade root spring according to the embodiments of the present disclosure will be described with reference to the drawings. The embodiments each indicate one aspect of the present disclosure, do not intend to limit the disclosure, and can optionally be modified within a range of a technical idea of the present disclosure.

<Blade Root Spring Assembled or Extracted by Jig and Method of the Present Disclosure>

Figure 1:
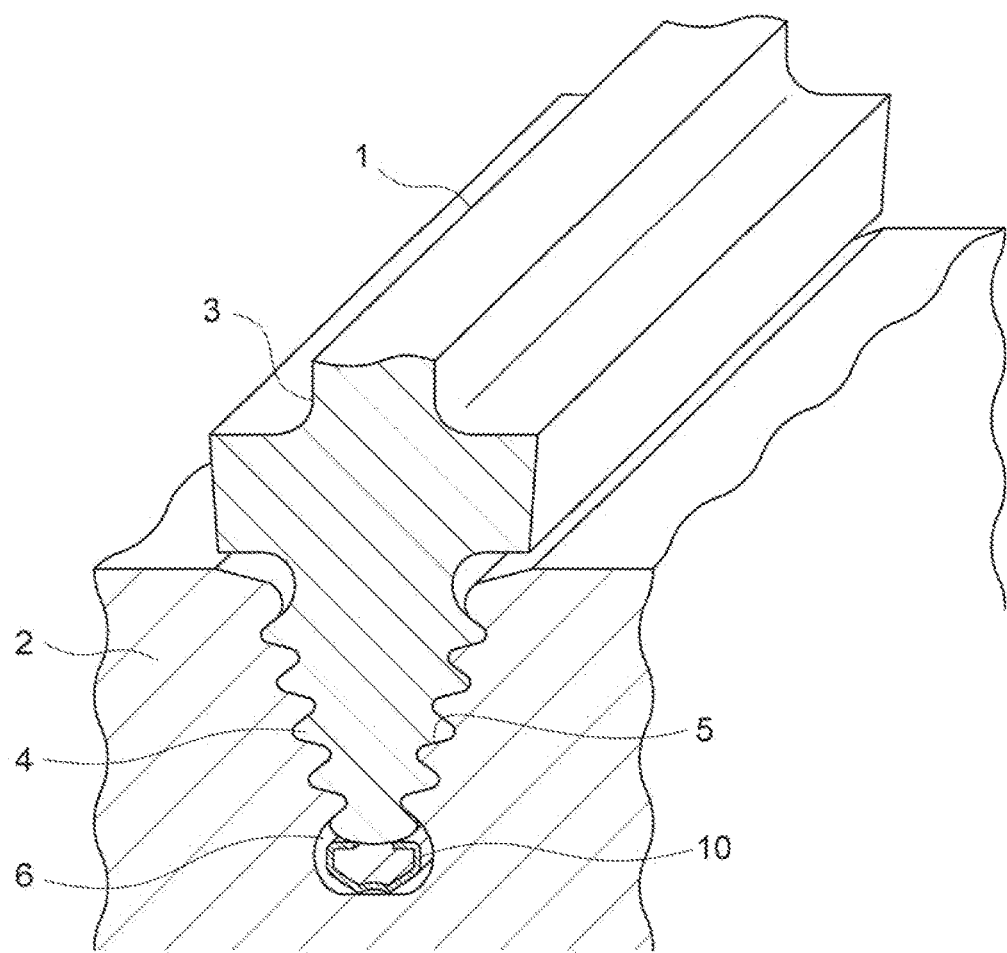
FIG. 1 is a cross-sectional view showing the configuration of a connection portion between a rotor blade and a rotor in a rotary machine.

As shown in FIG. 1, a rotary machine such as a gas turbine includes a rotatable rotor 2 to which a rotor blade 1 is fixed. The rotor blade 1 includes an airfoil portion 3 forming a blade surface (not shown), and a blade root portion 4 disposed at an end of the airfoil portion 3 on the rotor 2 side. The rotor blade 1 is mounted on the rotor 2 by inserting the blade root portion 4 into a blade groove 5 formed in the rotor 2.

Figure 2:
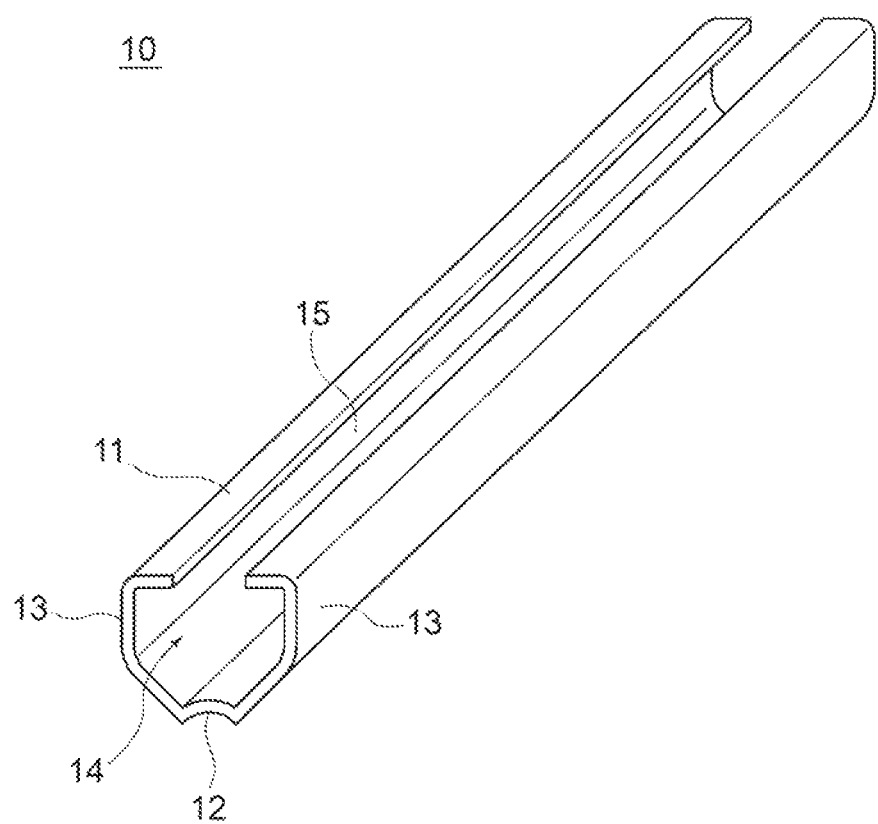
FIG. 2 is a perspective view of a blade root spring disposed between the rotor blade and the rotor in the rotary machine.

A gap 6 is formed between the blade root portion 4 and the blade groove 5. The gap 6 is formed on the inner side of the blade root portion 4 in the radial direction of the rotor 2. A blade root spring 10 is inserted into the gap 6. As shown in FIG. 2, the blade root spring 10 is a plate spring having the longitudinal direction, and has a rotor blade contact surface 11 and a rotor contact surface 12. The blade root spring 10 further has a pair of curved side surfaces 13, 13 connecting the rotor blade contact surface 11 and the rotor contact surface 12. These surfaces define a space 14 extending in the blade root spring 10 in the longitudinal direction. An opening 15 extending in the longitudinal direction is formed in the rotor blade contact surface 11.

As shown in FIG. 1, if the blade root spring 10 is inserted into the gap 6, the rotor blade contact surface 11 contacts the blade root portion 4, and the rotor contact surface 12 contacts an inner surface of the blade groove 5. The rotor blade 1 is pressed radially outward of the rotor 2 by an elastic force, which is generated by compression and contraction in the radial direction of the rotor 2 of the blade root spring 10 inserted into the gap 6, and thus the rotor blade 1 is fixed to the rotor 2, suppressing backlash of the rotor blade 1.

<Configuration of Jig of Present Disclosure>

Figure 3:
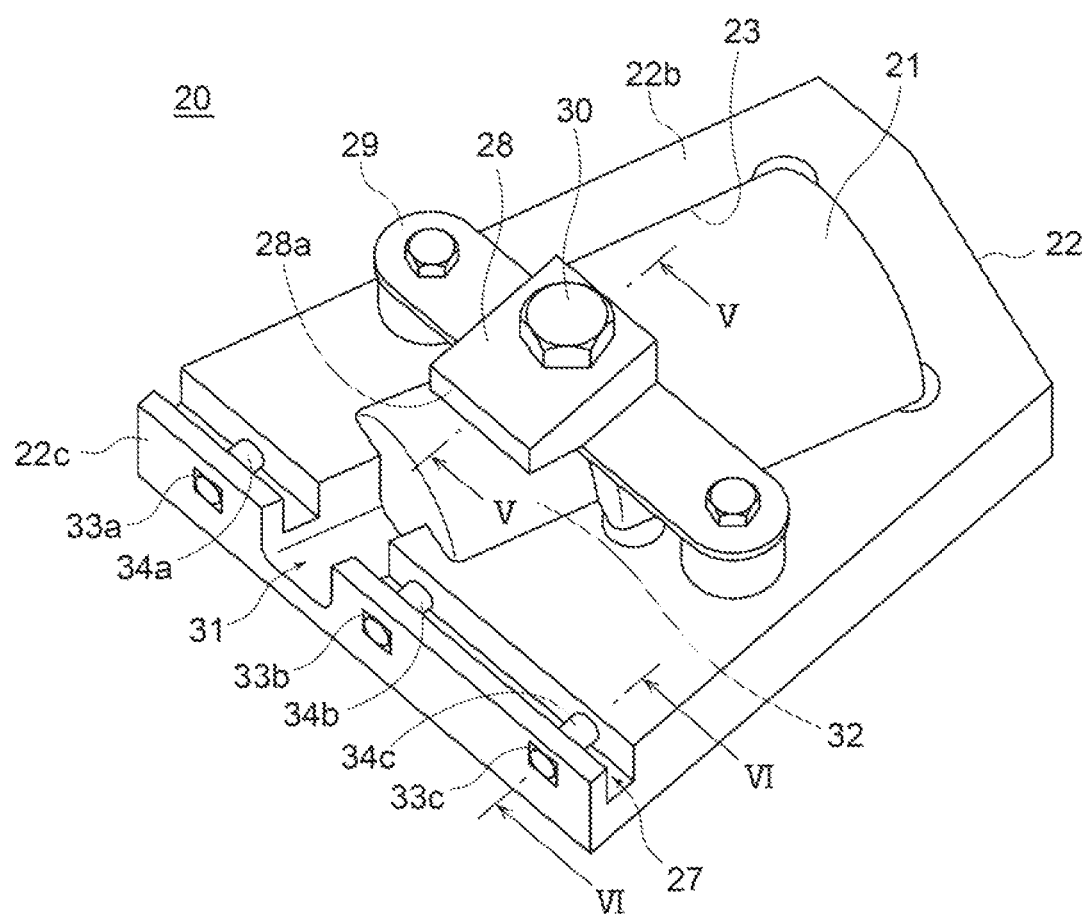
FIG. 3 is a top perspective view of a jig according to an embodiment of the present disclosure.
Figure 4:
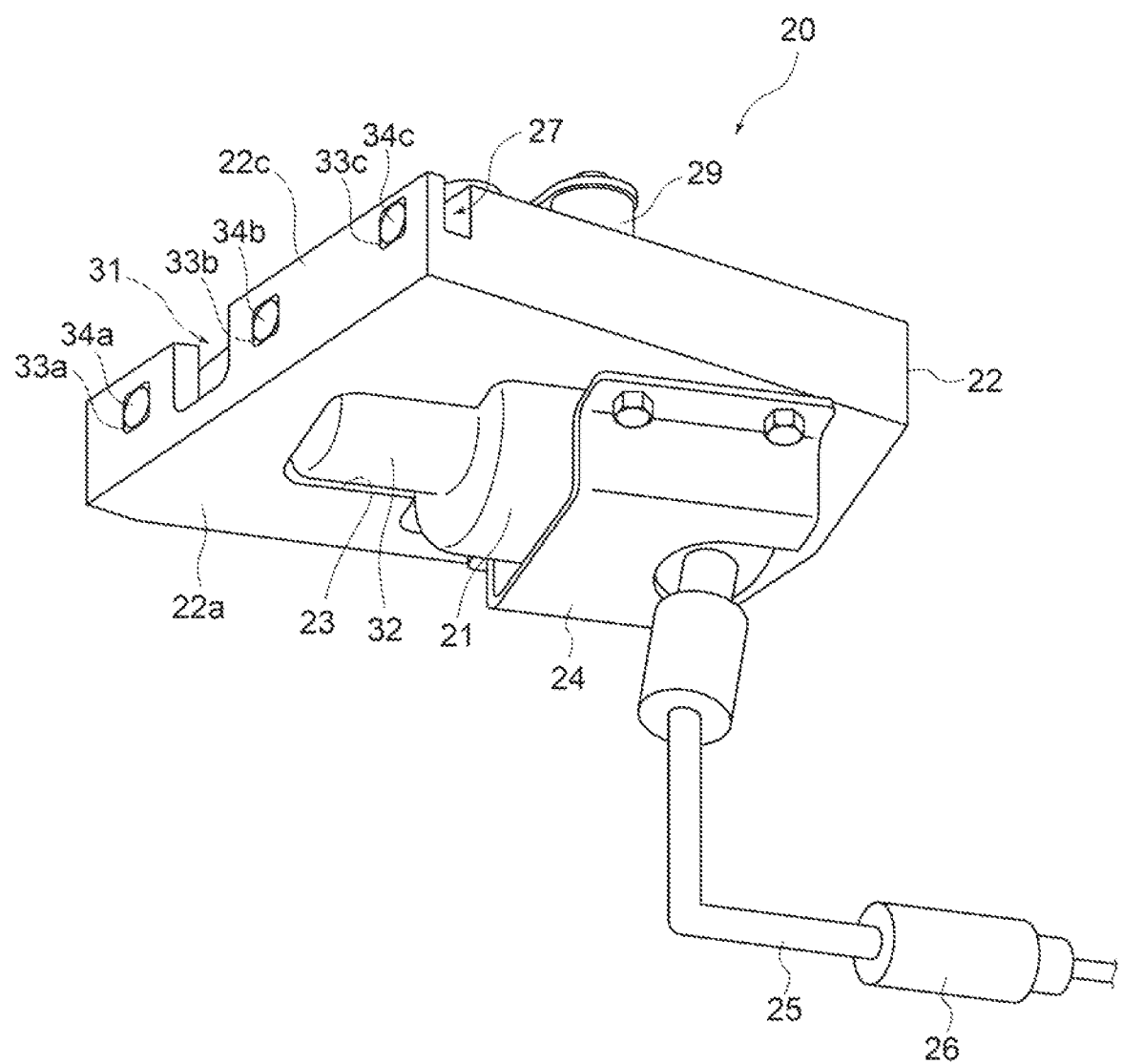
FIG. 4 is a bottom perspective view of the jig according to an embodiment of the present disclosure.

Next, the configuration of the jig for assembling and extracting the blade root spring 10 to and from the gap 6 will be described. As shown in FIG. 3, a jig 20 according to an embodiment of the present disclosure includes a hydraulic jack 21 which is an extrusion mechanism, and a base plate 22 to which the hydraulic jack 21 is fixed. As shown in FIG. 4, the base plate 22 is formed with a hole 23 in which the hydraulic jack 21 is inserted, and the hydraulic jack 21 inserted in the hole 23 is received by a jack receiver 24 fixed to a lower surface 22a of the base plate 22, thereby fixing the hydraulic jack 21 to the base plate 22. The hydraulic jack 21 is connected to one end of a hose 25, and the hose 25 is provided with a hydraulic pump 26.

As shown in FIG. 3, a first groove 27 for receiving a reaction force generated by an operation described later is formed in an upper surface 22b of the base plate 22. Further, the upper surface 22b of the base plate 22 is provided with, via a mounting portion 29, a self-weight receiving portion 28 for receiving the self-weight of the jig 20 by an operation described later. The self-weight receiving portion 28 is rotatable around a shaft 30 disposed on the mounting portion 29. The self-weight receiving portion 28 has a shape having the longitudinal direction, for example, a rectangular shape in a planar view.

Figure 5:
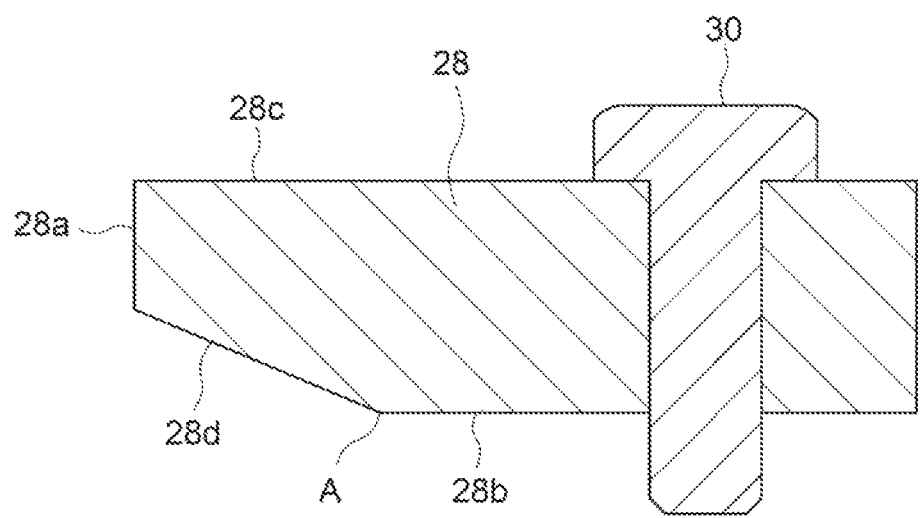
FIG. 5 is a cross-sectional view taken along line V-V in FIG. 3.

As shown in FIG. 5, the self-weight receiving portion 28 has an end 28a located farthest from the shaft 30 in the longitudinal direction, and has a shape whose thickness decreases toward the end 28a from a position A between the shaft 30 and the end 28a. Thus, the lower surface 28b of the self-weight receiving portion 28 facing the upper surface 22b (see FIG. 3) of the base plate 22 includes a self-weight receiving surface 28d inclined to an upper surface 28c side of the self-weight receiving portion 28 from the position A toward the end 28a. As shown in FIG. 3, in a state where the self-weight receiving portion 28 is rotated around the shaft 30 such that the end 28a of the self-weight receiving portion 28 faces the first groove 27, that is, a state where a direction along the inclination of the self-weight receiving surface 28d (see FIG. 5) of the self-weight receiving portion 28 intersects an extension direction of the first groove 27, the self-weight receiving surface 28d is located between the first groove 27 and the hydraulic jack 21.

The hydraulic jack 21 includes a piston portion 32 that can be expanded and contracted by a hydraulic pressure. The upper surface 22b of the base plate 22 is formed with a second groove 31 extending in a direction in which the piston portion 32 expands and contracts from one end opening to the hole 23. The first groove 27 and the second groove 31 intersect with each other at an angle other than 90°. The second groove 31 intersects with the first groove 27, and extends such that another end of the second groove 31 opens to a side surface 22c of the base plate 22.

The base plate 22 is formed with three pores 33a, 33b, 33c extending from the side surface 22c of the base plate 22 to the first groove 27. The pore 33a and the pores 33b, 33c are disposed opposite to each other across the second groove 31. The number of pores is not limited to three, and may be not less than four as long as the pores are disposed on both sides of the second groove 31. Positioning pins 34a, 34b, 34c can be inserted in the pores 33a, 33b, 33c, respectively.

Figure 6:
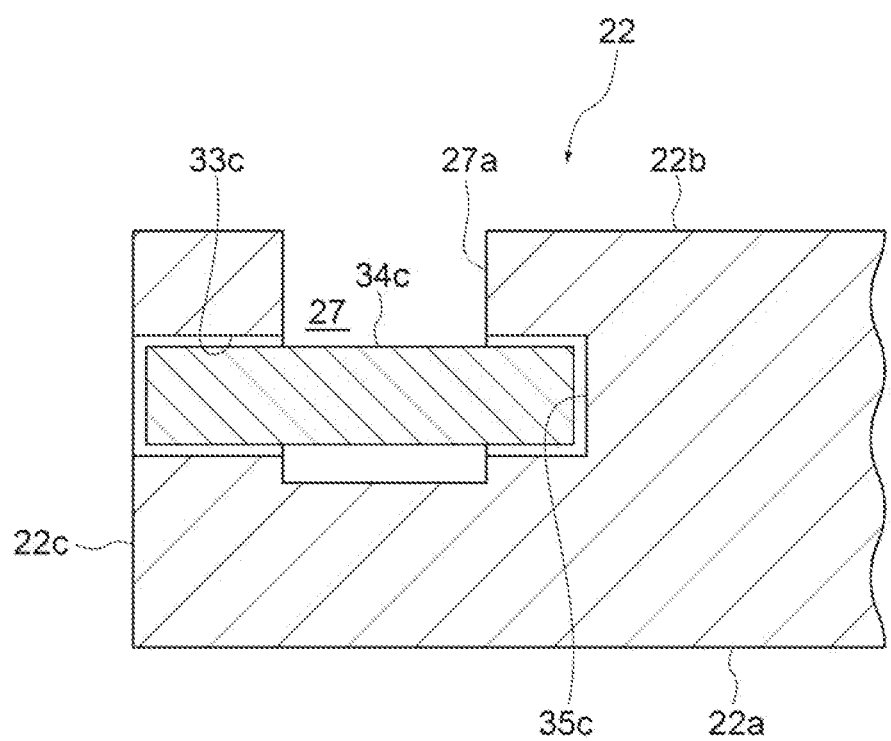
FIG. 6 is a cross-sectional view taken along the line VI-VI in FIG. 3.

As shown in FIG. 6, an inner surface 27a of the first groove 27 is formed with a recess 35c at a position corresponding to an extension direction of the pore 33c, and if the positioning pin 34c is inserted and pushed into the pore 33c, the end of the positioning pin 34c is inserted in the recess 35c across the first groove 27. Although not shown, the inner surface 27a of the first groove 27 is formed with a recess having the same configuration as the recess 35c at a position corresponding to an extension direction of the pore 33a, 33b, and if the positioning pin 34a, 34b is inserted and pushed into the pore 33b, 33c, as with the positioning pin 34c, the end of the positioning pin 34a, 34b is inserted in the recess formed in the inner surface 27a of the first groove 27.

<Method for Assembling and Extracting Blade Root Spring by Using Jig of Present Disclosure (Operation of Jig)>

As shown in FIG. 1, a method for extracting the blade root spring 10 inserted in the gap 6 will be described. The jig 20 of FIGS. 3 and 4 used in the method is prepared (preparation step). The method for extracting the blade root spring 10 uses a plurality of extrusion rods 40 shown in FIG. 7. The plurality of extrusion rods 40 include one tip rod 41 and at least one extension rod 42.

The tip rod 41 includes a body portion 41a of a shape in which a member having a substantially rectangular solid shape and a member having a substantially semicircular cross section are stacked in a direction orthogonal to the longitudinal direction. One end surface 41a1 of the body portion 41a is provided with an insertion portion 41b which has the same shape as the body portion 41a but is thinner than the body portion 41a. Another end surface 41a2 of the body portion 41a is formed with a columnar recess 41c. The extension rod 42 includes a columnar body portion 42a One end surface 42a1 of the body portion 42a is provided with an insertion portion 42b which has the same columnar shape as the body portion 42a but is thinner than the body portion 42a Another end surface 42a2 of the body portion 42a is formed with a columnar recess 42c.

The insertion portion 41b of the tip rod 41 can be inserted into the space 14 of the blade root spring 10. If the insertion portion 41b is inserted into the space 14, the end surface 41a1 of the body portion 41a of the tip rod 41 comes into contact with the end 10a of the blade root spring 10. The insertion portion 42b of the extension rod 42 can be inserted in the recess 41c of the tip rod 41, and if the insertion portion 42b is inserted in the recess 41c, the end surface 41a2 of the body portion 41a of the tip rod 41 and the end surface 42a1 of the body portion 42a of the extension rod 42 come into contact with each other. Further, the insertion portion 42b of the another extension rod 42 can be inserted in the recess 42c of the extension rod 42, and if the insertion portion 42b of the another extension rod 42 is inserted in the recess 42c of the one extension rod 42, the end surface 42a2 of the body portion 42a of the one extension rod 42 and the end surface 42a1 of the body portion 42a of the another extension rod 42 come into contact with each other.

Figure 8:
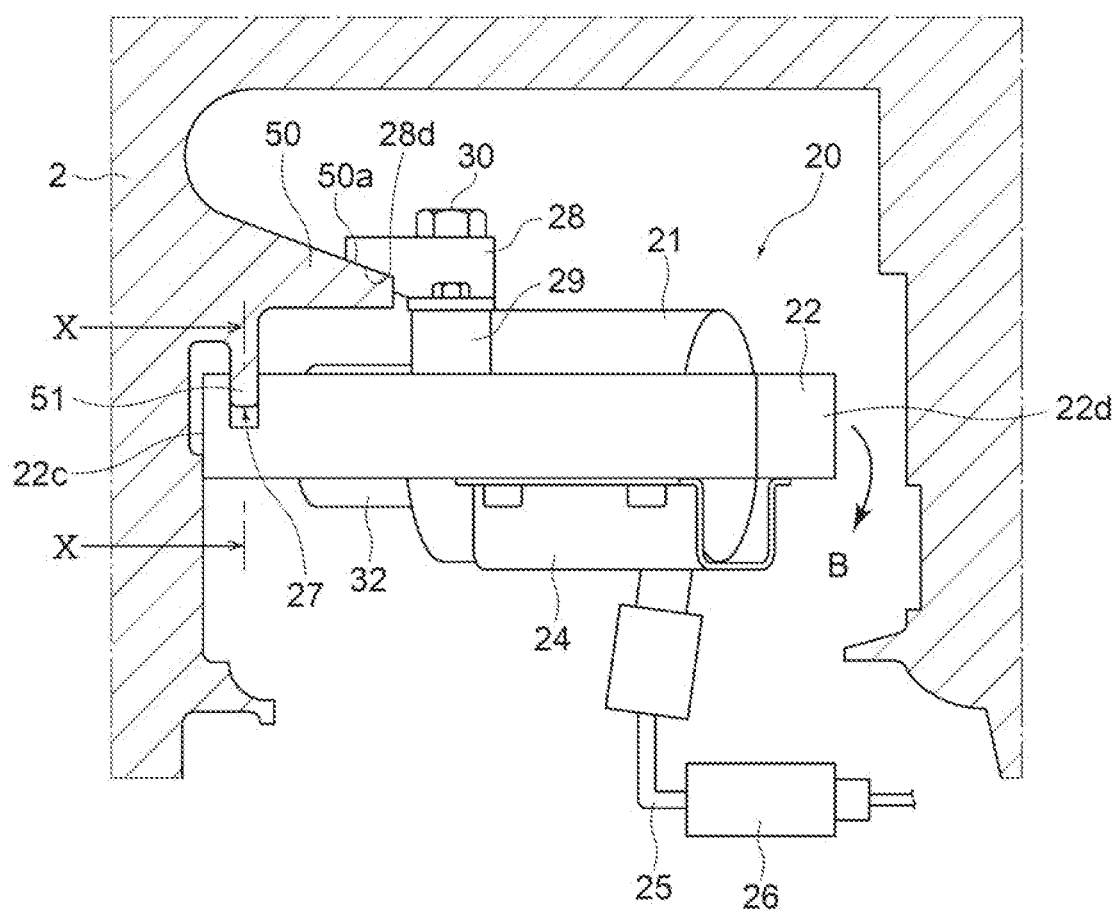
FIG. 8 is a view of a state where the jig is fixed to the rotor according to an embodiment of the present disclosure.

After the preparation step, the jig 20 (see FIGS. 3 and 4) is mounted on the rotor 2 (see FIG. 1) (mounting step). FIG. 8 shows a state where the jig 20 is mounted on the rotor 2. The rotor 2 is provided with a seal arm 50 projecting in the axial direction of the rotor 2, and a protrusion 51 extends radially outward (downward in FIG. 8) of the rotor 2 from the seal arm 50. The protrusion 51 also extends in the circumferential direction of the rotor 2 (a direction perpendicular to the drawing in FIG. 8). FIG. 8 is drawn such that a lower side faces downward in the vertical direction, but the self-weight receiving surface 28d is in contact with an upward surface 50a of the seal arm 50. The protrusion 51 is inserted into the first groove 27.

The self-weight receiving surface 28d pushes the surface 50a of the seal arm 50 downward, whereby the self-weight receiving portion 28 receives the self-weight of the jig 20. Since the heavy hydraulic jack 21 is located on the side surface 22d side of the base plate 22 located opposite to the side surface 22c of the base plate 22 across the self-weight receiving portion 28 (that is, the center of gravity of the jig 20 is on the side surface 22d side), the jig 20 rotates such that the side surface 22d side of the base plate 22 moves downward (in the direction of an arrow B) around a contact portion between the self-weight receiving surface 28d and the surface 50a of the seal arm 50.

Figure 9:
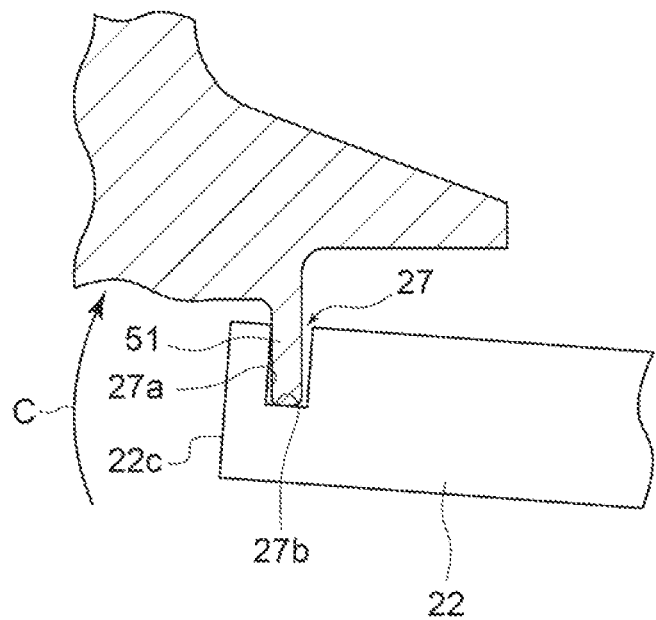
FIG. 9 is an enlarged view of a part of a jig 20 in the state where the jig is fixed to the rotor according to an embodiment of the present disclosure.

On the other hand, as shown in FIG. 9, the jig 20 rotates such that the side surface 22c side of the base plate 22 moves upward (in the direction of an arrow C). Then, a bottom surface 27b serving as a part of the inner surface 27a of the first groove 27 upwardly contacts the protrusion 51. Consequently, the rotation of the jig 20 is stopped, and the jig 20 is mounted on the rotor 2. The rotation of the jig 20 may be stopped by bringing the inner surface 27a of the first groove 27 other than the bottom surface 27b into upward contact with the protrusion 51.

In the jig 20, since the first groove 27 is located, relative to the hydraulic jack 21, in a direction where the piston portion 32 extrudes the extrusion rod 40, the jig 20 can be mounted in the vicinity of the rotor 2 from which the blade root spring 10 is extracted. Thus, it is possible to improve efficiency of extraction work for the blade root spring 10 even if the workplace is narrow.

Figure 10:
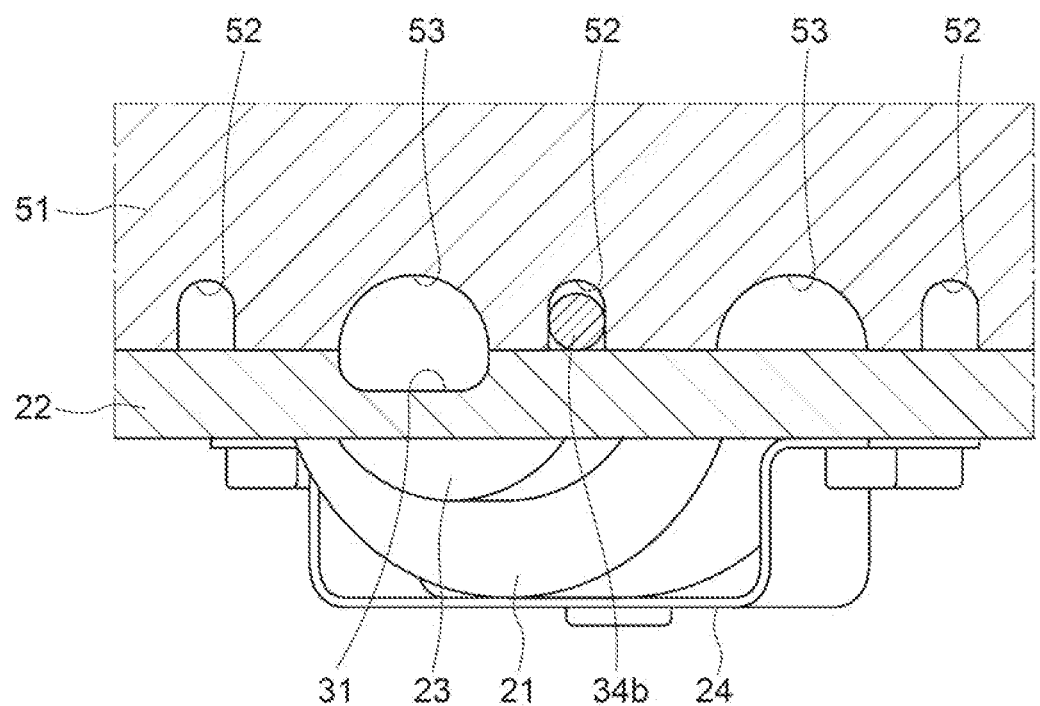
FIG. 10 is a cross-sectional view taken along line X-X in FIG. 8.

As shown in FIG. 10, a plurality of locking key grooves 52 and grooves 53 located on an extension line of the gap 6 (see FIG. 1) are formed at an end edge of the protrusion 51. If one of the plurality of positioning pins 34a. 34b, 34c, for example, the positioning pin 34b is installed on the base plate 22 and the positioning pin 34b is fitted into any one of the plurality of locking key grooves 52, any one of the grooves 53 and the second groove 31 overlap each other, whereby the gap 6 is located on the extension line of the second groove 31. Such positioning step can be performed between the preparation step and the mounting step, making it possible to easily decide the mounting position of the jig 20 in the circumferential direction of the rotor 2. Which positioning pin is used for positioning the jig 20 is determined based on the positional relationship between the grooves 53 and the locking key grooves 52 formed at the end edge of the protrusion 51, in other words, the configuration of the rotary machine including the rotor blade 1 and the rotor 2.

Figure 11:
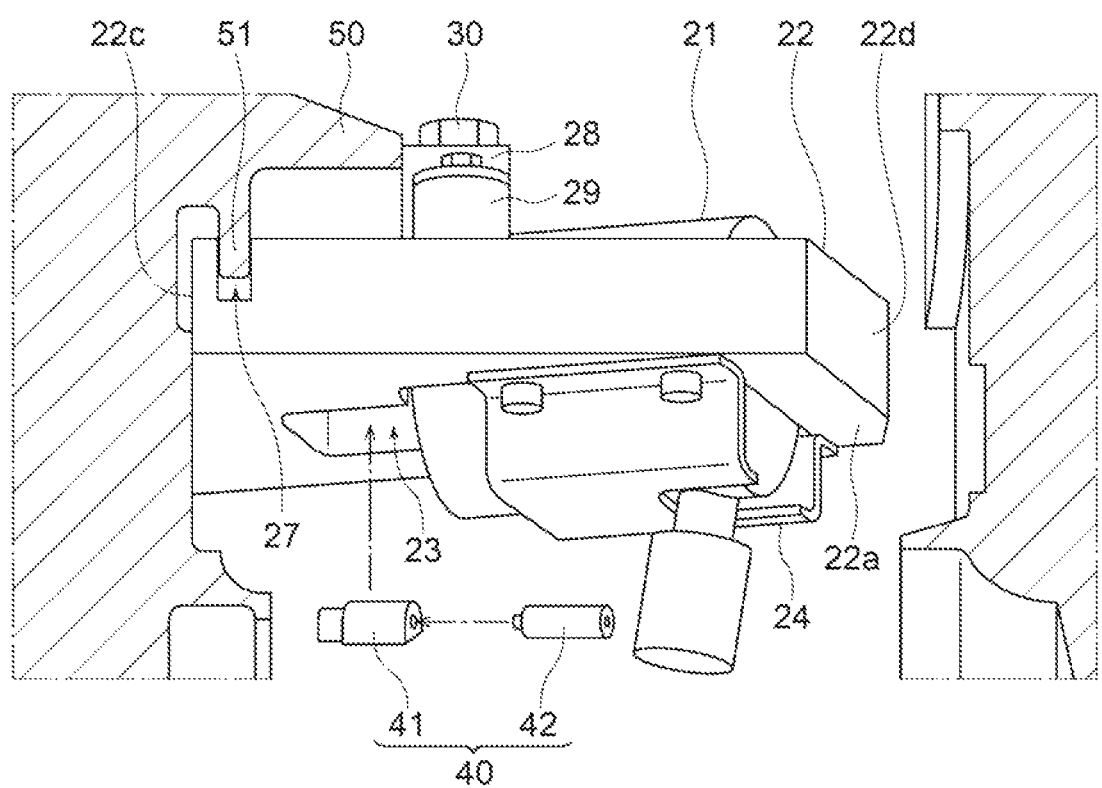
FIG. 11 is a view for describing setting of the extrusion rod with respect to the jig according to an embodiment of the present disclosure.

After the mounting step, the hydraulic jack 21 (FIGS. 3 and 4) extrudes the extrusion rod 40 (see FIG. 7) toward the blade root spring 10 (see FIG. 1) inserted in the gap 6 (extrusion step). As shown in FIG. 11, the tip rod 41 is placed in the second groove 31 (see FIG. 3) from the lower surface 22a side of the base plate 22 via the hole 23. If the hydraulic jack 21 is driven to extend the piston portion 32 (see FIG. 3), the tip rod 41 is pushed by the piston portion 32 and extruded, through the second groove 31, toward the blade root spring 10 inserted in the gap 6.

Figure 7:
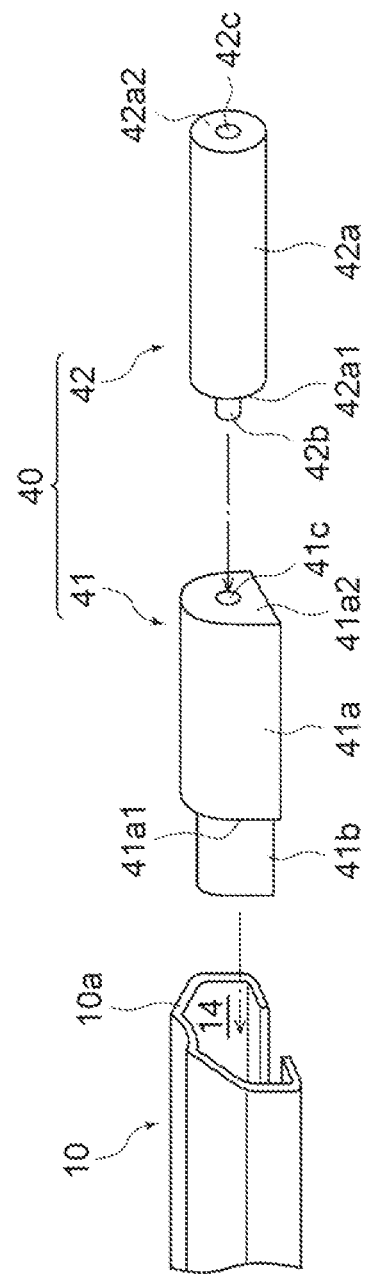
FIG. 7 is a perspective view of an extrusion rod and the blade root spring used together with the jig according to an embodiment of the present disclosure.

Then, as shown in FIG. 7, the insertion portion 41b of the tip rod 41 is inserted into the space 14 of the blade root spring 10, and the end surface 41a1 of the body portion 41a of the tip rod 41 pushes the end 10a of the blade root spring 10. As a result, the blade root spring 10 moves in the gap 6 (see FIG. 1). At least a part of the tip rod 41 is inserted into the gap 6.

Subsequently, after the piston portion 32 is contracted, as shown in FIG. 11, the extension rod 42 is placed in the second groove 31 (see FIG. 3) from the lower surface 22a side of the base plate 22 via the hole 23. If the hydraulic jack 21 is driven to extend the piston portion 32 (see FIG. 3), the extension rod 42 is pushed by the piston portion 32 and extruded, through the second groove 31, toward the blade root spring 10 inserted in the gap 6.

Then, as shown in FIG. 7, the insertion portion 42b of the extension rod 42 is inserted into the recess 41c of the tip rod 41, and the end surface 42a1 of the body portion 42a of the extension rod 42 pushes the end surface 42a1 of the body portion 41a of the tip rod 41. As a result, the blade root spring 10 further moves in the gap 6 (see FIG. 1). The tip rod 41 is further inserted into the gap 6, and at least a part of the extension rod 42 is inserted into the gap 6.

Figure 12:
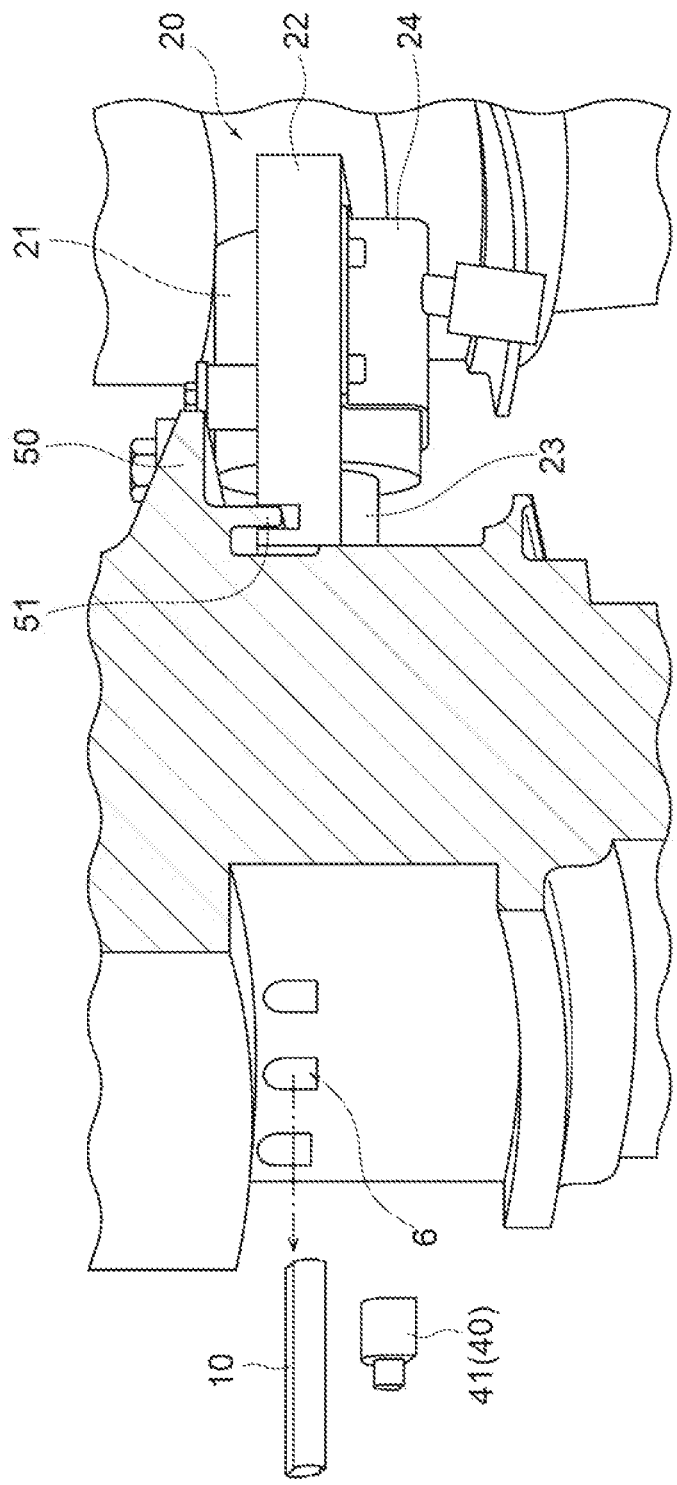
FIG. 12 is a perspective view showing a state where the blade root spring is extracted with the jig according to an embodiment of the present disclosure.

Thereafter, by repeatedly extruding the extension rod 42 toward the blade root spring 10, the blade root spring 10 gradually moves in the gap 6 (see FIG. 1) and eventually as shown in FIG. 12, the blade root spring 10 is extracted from the gap 6. Once the blade root spring 10 is extracted, the extrusion rod 40 in the gap 6 is extracted, thereby terminating the extraction operation for the blade root spring 10.

When the piston portion 32 pushes the blade root spring 10 by extruding the tip rod 41 or the extension rod 42, the resultant reaction force is applied to the jig 20. As described above with reference to FIG. 11, the jig 20 is mounted on the rotor 2 by the engagement of the self-weight receiving portion 28 and the seal arm 50, and the engagement of the first groove 27 and the protrusion 51. Since the tip rod 41 or the extension rod 42 is extruded toward the end 22c by the piston portion 32, the above-described reaction force is applied to the jig 20 toward the opposite end 22d. Meanwhile, since the protrusion 51 is inserted in the first groove 27, even if the jig 20 is moved toward the end 22d by the reaction force, the protrusion 51 comes into contact with the inner surface 27a of the first groove 27 and stops the movement. That is, the reaction force is received by the inner surface 27a of the first groove 27.

Thus, with the jig 20 being mounted on the rotor 2, by inserting the protrusion 51 of the rotor 2 in the first groove 27, it is possible to receive the reaction force, which is obtained when the piston portion 32 extrudes the extrusion rod 40 toward the blade root spring 10 to extract the blade root spring 10, by bringing the protrusion 51 into contact with the inner surface 27a of the first groove 27. Thus, it is possible to reliably extract the blade root spring 10. Further, since the blade root spring 10 is extracted by extruding the extrusion rod 40 toward the blade root spring 10 with the piston portion 32, it is possible to improve efficiency of the extraction work for the blade root spring 10.

The method for extracting the blade root spring 10 has been described so far, but the method for assembling the blade root spring 10 is substantially the same as the method for extracting the blade root spring 10. Since the blade root spring 10 is longer than the extrusion rod 40, the blade root spring 10 is inserted into the gap 6 as much as possible by inserting one end of the blade root spring 10 in the gap 6 and hitting another end of the blade root spring 10 with a hammer or the like.

Subsequently, the preparation step and the mounting step are performed in the same manner as in the method for extracting the blade root spring 10. In the mounting step, the blade root spring 10 partially inserted into the gap 6 is fitted into the second groove 31. Thereafter, the piston portion 32 extrudes the blade root spring 10 (extrusion step), thereby inserting the blade root spring 10 into the gap 6 to be assembled. At that time, the blade root spring 10 may be extruded via the extrusion rod 40, if necessary.

Also in the case of assembling the blade root spring 10, when the piston portion 32 extrudes the blade root spring 10, the resultant reaction force is applied to the jig 20. This reaction force can also be received by bringing the protrusion 51 into contact with the inner surface 27a of the first groove 27, as in the case of the method for extracting the blade root spring 10. Further, since the blade root spring 10 is assembled by extruding the blade root spring 10 with the piston portion 32, it is possible to improve efficiency of the assembly work for the blade root spring 10.

The contents described in the above embodiments would be understood as follows, for instance.

[1] A jig for assembling and extracting a blade root spring according to one aspect is a jig for assembling and extracting a blade root spring (10) for fixing a rotor blade (1) to a rotor (2), that includes: an extrusion mechanism (hydraulic jack 21) for extruding the blade root spring (10) or an extrusion rod (40) pressed against the blade root spring (10); and a base plate (22) to which the extrusion mechanism (21) is fixed. The base plate (22) is formed with a first groove (27) for receiving a reaction force which is obtained when the extrusion mechanism (21) extrudes the extrusion rod (40) toward the blade root spring (10) to extrude and assemble the blade root spring (10) or to extract the blade root spring (10).

With the jig for assembling and extracting the blade root spring of the present disclosure, since the extrusion mechanism extrudes the extrusion rod toward the blade root spring to extrude and assemble the blade root spring or to extract the blade root spring, it is possible to improve efficiency of the assembly and extraction work for the blade root spring. Further, with the jig being mounted on the rotor, by inserting the protrusion of the rotor in the first groove, it is possible to receive the reaction force, which is obtained when the extrusion mechanism extrudes the extrusion rod toward the blade root spring to extract the blade root spring or to extrude and assemble the blade root spring, by bringing the protrusion into contact with the inner surface of the first groove.

[2] A jig according to another aspect is the jig as defined in [1], where the jig (20) further includes a self-weight receiving portion (28) having a self-weight receiving surface (28d) for receiving a self-weight of the jig (20), and the self-weight receiving surface (28d) is located between the first groove (27) and the extrusion mechanism (21), and extends in a direction intersecting with an extension direction of the first groove (27) when the self-weight receiving surface (28d) receives the self-weight.

With such configuration, since the self-weight receiving surface is brought into contact with a surface of the rotor vertically downward and the inner surface of the first groove is brought into contact with the protrusion vertically upward, it is possible to mount the jig on the rotor.

[3] A jig according to still another aspect is the jig as defined in [2], where the first groove (27) has a bottom surface (27b) as a part of an inner surface (27a) of the first groove (27).

With such configuration, since the self-weight receiving surface is brought into contact with the surface of the rotor vertically downward and the bottom surface serving as a part of the inner surface of the first groove is brought into contact with the protrusion vertically upward, it is possible to more reliably mount the jig on the rotor.

[4] A jig according to yet another aspect is the jig as defined in any one of [1] to [3], where the first groove (27) is located in a direction in which the extrusion mechanism (21) extrudes the extrusion rod (40) or the blade root spring (10), relative to the extrusion mechanism (21).

With such configuration, since the jig can be mounted in the vicinity of the rotor where the blade root spring is assembled or extracted, it is possible to improve efficiency of the assembly and extraction work for the blade root spring even if the workplace is narrow.

[5] A jig according to yet another aspect is the jig as defined in any one of [4], where the base plate (22) is formed with a second groove (31) in which the extrusion rod (40) or the blade root spring (10) is inserted when the extrusion mechanism (21) extrudes the extrusion rod (40) or the blade root spring (10), and the first groove (27) and the second groove (31) intersect with each other.

With such configuration, since the jig can be mounted in the vicinity of the rotor where the blade root spring is assembled or extracted, it is possible to improve efficiency of the assembly and extraction work for the blade root spring even if the workplace is narrow.

[6] A jig according to yet another aspect is the jig as defined in any one of [1] to [5], where the base plate (22) is detachably provided with a positioning pin (34a, 34b, 34c) disposed so as to cross the first groove (27).

With such configuration, when the jig is mounted on the rotor, by fitting the positioning pin into one of a plurality of locking key grooves formed at an end edge of the protrusion, it is possible to easily decide the mounting position in the circumferential direction of the rotor.

[7] A method for assembling and extracting a blade root spring according to one aspect is a method for assembling and extracting a blade root spring (10) for fixing a rotor blade (1) to a rotor (2), that includes: a preparation step of preparing a jig (20) that includes an extrusion mechanism (hydraulic jack 21) for extruding the blade root spring (10) or an extrusion rod (40) pressed against the blade root spring (10), and a base plate (22) to which the extrusion mechanism (21) is fixed; a mounting step of mounting the jig (20) on the rotor (2); and an extrusion step of extruding the extrusion rod (40) or the blade root spring (10) by the extrusion mechanism (21). The base plate (22) is formed with a first groove (27) configured to allow for insertion of a protrusion (51) of the rotor (2). The extrusion step includes receiving a reaction force, which is obtained when the extrusion mechanism (21) extrudes the extrusion rod (40) toward the blade root spring (10) to extrude and assemble the blade root spring (10) or to extract the blade root spring (10), by bringing the protrusion (51) into contact with an inner surface (27a) of the first groove (27).

With the method for assembling and extracting the blade root spring of the present disclosure, since the extrusion mechanism extrudes the extrusion rod toward the blade root spring to extrude and assemble the blade root spring or to extract the blade root spring, it is possible to improve efficiency of the assembly and extraction work for the blade root spring. Further, with the jig being mounted on the rotor, by inserting the protrusion of the rotor in the first groove, it is possible to receive the reaction force, which is obtained when the extrusion mechanism extrudes the extrusion rod toward the blade root spring to extract the blade root spring or to extrude and assemble the blade root spring, by bringing the protrusion into contact with the inner surface of the first groove.

[8] A method according to another aspect is the method as defined in [7], where the jig (20) further includes a self-weight receiving portion (28) having a self-weight receiving surface (28d) for receiving a self-weight of the jig (20), the self-weight receiving surface (28d) is located between the first groove (27) and the extrusion mechanism (21), and extends in a direction intersecting with an extension direction of the first groove (27) when the self-weight receiving surface (28d) receives the self-weight, and the mounting step includes mounting the jig (20) on the rotor (2) by bringing the self-weight receiving surface (28d) into contact with a surface (50a) of the rotor (2) vertically downward and bringing the inner surface (27a) of the first groove (27) into contact with the protrusion (51) vertically upward.

With such method, since the self-weight receiving surface is brought into contact with the surface of the rotor vertically downward and the inner surface of the first groove is brought into contact with the protrusion vertically upward, it is possible to mount the jig on the rotor.

[9] A method according to still another aspect is the method as defined in [8], where the first groove (27) has a bottom surface (27b) as a part of the inner surface (27a), and the mounting step includes bringing the bottom surface (27b) into contact with the protrusion (51) vertically upward.

With such method, since the self-weight receiving surface is brought into contact with the surface of the rotor vertically downward and the bottom surface of the first groove is brought into contact with the protrusion vertically upward, it is possible to more reliably mount the jig on the rotor.

[10] A method according to yet another aspect is the method as defined in [7] to [9], where the base plate (22) is detachably provided with a positioning pin (34a, 34b. 34c) disposed so as to cross the first groove (27), the method for assembling and extracting the blade root spring (10) further includes, between the preparation step and the mounting step, a positioning step of deciding a mounting position of the base plate (22) in a circumferential direction of the rotor (2), and the positioning step includes deciding the mounting position of the base plate (22) in the circumferential direction of the rotor (2) based on the positioning pin (34a, 34b, 34c) and a locking key groove (52) formed in the protrusion (51).

With such method, when the jig is mounted on the rotor, it is possible to easily decide the mounting position in the circumferential direction of the rotor.

REFERENCE SIGNS LIST

1 Rotor blade
2 Rotor
10 Blade root spring
20 Jig
21 Hydraulic jack (extrusion mechanism)
22 Base plate
27 First groove
27a Inner surface (of first groove)
27b Bottom surface (of first groove)
28 Self-weight receiving portion
28d Self-weight receiving surface
31 Second groove
34a Positioning pin
34b Positioning pin
34c Positioning pin
40 Extrusion rod
50a Surface (of rotor)
51 Protrusion

The invention claimed is:

1. A jig for assembling and extracting a blade root spring for fixing a rotor blade to a rotor, the jig comprising:
   a jack for extruding the blade root spring or an extrusion rod pressed against the blade root spring;
   a base plate to which the jack is fixed;
   a mounting portion fixed to the base plate,
   wherein the base plate is formed with a first groove for receiving a reaction force which is obtained when the jack extrudes the extrusion rod toward the blade root spring to extrude and assemble the blade root spring or to extract the blade root spring, wherein the jig further includes a self-weight receiving portion having a self-weight receiving surface for receiving a self-weight of the jig, wherein the self-weight receiving portion is rotatable around a shaft disposed on the mounting portion, has an end located farthest from the shaft in a longitudinal direction of the self-weight receiving portion, and has a shape whose thickness decreases toward the end from a position between the shaft and the end, and wherein the self-weight receiving surface is located between the first groove and the jack, and extends in a direction intersecting with an extension direction of the first groove when the self-weight receiving surface receives the self-weight.

2. The jig for assembling and extracting the blade root spring according to claim 1,
wherein the first groove has a bottom surface as a part of an inner surface of the first groove.

3. The jig for assembling and extracting the blade root spring according to claim 1,
wherein the first groove is located in a direction in which the jack extrudes the extrusion rod or the blade root spring, relative to the jack.

4. The jig for assembling and extracting the blade root spring according to claim 1, wherein the jack is a hydraulic jack.

5. A jig for assembling and extracting a blade root spring for fixing a rotor blade to a rotor, the jig comprising:
an extrusion mechanism for extruding the blade root spring or an extrusion rod pressed against the blade root spring; and
a base plate to which the extrusion mechanism is fixed,
wherein the base plate is formed with a first groove for receiving a reaction force which is obtained when the extrusion mechanism extrudes the extrusion rod toward the blade root spring to extrude and assemble the blade root spring or to extract the bladeroot spring,
wherein the first groove is located in a direction in which the extrusion mechanism extrudes the extrusion rod or the blade root spring, relative to the extrusion mechanism,
wherein the base plate is formed with a second groove in which the extrusion rod or the blade root spring is inserted when the extrusion mechanism extrudes the extrusion rod or the blade root spring, and
wherein the first groove and the second groove intersect with each other.

6. A jig for assembling and extracting a blade root spring for fixing a rotor blade to a rotor, the jig comprising:
an extrusion mechanism for extruding the blade root spring or an extrusion rod pressed against the blade root spring; and
a base plate to which the extrusion mechanism is fixed,
wherein the base plate is formed with a first groove for receiving a reaction force which is obtained when the extrusion mechanism extrudes the extrusion rod toward the blade root spring to extrude and assemble the blade root spring or to extract the blade root spring, and
wherein the base plate is detachably provided with a positioning pin disposed so as to cross the first groove.

7. A method for assembling and extracting a blade root spring for fixing a rotor blade to a rotor, the method comprising:
a preparation step of preparing a jig that includes a jack for extruding the blade root spring or an extrusion rod pressed against the blade root spring,
a base plate to which the jack is fixed, and a mounting portion fixed to the base plate;
a mounting step of mounting the jig on the rotor; and
an extrusion step of extruding the extrusion rod or the blade root spring by the jack,
wherein the base plate is formed with a first groove configured to allow for insertion of a protrusion of the rotor,
wherein the extrusion step includes receiving a reaction force, which is obtained when the jack extrudes the extrusion rod toward the blade root spring to extrude and assemble the blade root spring or to extract the blade root spring, by bringing the protrusion into contact with an inner surface of the first groove,
wherein the jig further includes a self-weight receiving portion having a self-weight receiving surface for receiving a self-weight of the jig,
wherein the self-weight receiving portion is rotatable around a shaft disposed on the mounting portion, has an end located farthest from the shaft in a longitudinal direction of the self-weight receiving portion, and has a shape whose thickness decreases toward the end from a position between the shaft and the end,
wherein the self-weight receiving surface is located between the first groove and the jack, and extends in a direction intersecting with an extension direction of the first groove when the self-weight receiving surface receives the self-weight, and
wherein the mounting step includes mounting the jig on the rotor by bringing the self-weight receiving surface into contact with a surface of the rotor vertically downward and bringing the inner surface of the first groove into contact with the protrusion vertically upward.

8. The method for assembling and extracting the blade root spring according to claim 7,
wherein the first groove has a bottom surface as a part of the inner surface, and
wherein the mounting step includes bringing the bottom surface into contact with the protrusion vertically upward.

9. The jig for assembling and extracting the blade root spring according to claim 7, wherein the jack is a hydraulic jack.

10. A method for assembling and extracting a blade root spring for fixing a rotor blade to a rotor, the method comprising:
a preparation step of preparing a jig that includes an extrusion mechanism for extruding the blade root spring or an extrusion rod pressed against the blade root spring, and a base plate to which the extrusion mechanism is fixed;
a mounting step of mounting the jig on the rotor; and
an extrusion step of extruding the extrusion rod or the blade root spring by the extrusion mechanism,
wherein the base plate is formed with a first groove configured to allow for insertion of a protrusion of the rotor,
wherein the extrusion step includes receiving a reaction force, which is obtained when the extrusion mechanism extrudes the extrusion rod toward the blade root spring to extrude and assemble the blade root spring or to extract the blade root spring, by bringing the protrusion into contact with an inner surface of the first groove,
wherein the base plate is detachably provided with a positioning pin disposed so as to cross the first groove, wherein the method for assembling and extracting the blade root spring further comprises, between the preparation step and the mounting step, a positioning step of deciding a mounting position of the base plate in a circumferential direction of the rotor, and wherein the positioning step includes deciding the mounting position of the base plate in the circumferential direction of the rotor based on the positioning pin and a locking key groove formed in the protrusion.

* * * * *